United States Patent [19]

Morikawa

[11] Patent Number: 4,483,146
[45] Date of Patent: Nov. 20, 1984

[54] SYSTEM FOR CONTROLLING THE SUPERCHARGING PRESSURE OF A TURBOCHARGED INTERNAL COMBUSTION ENGINE HAVING MEANS FOR SENSING CYLINDER PRESSURE

[75] Inventor: Koji Morikawa, Tokyo, Japan

[73] Assignee: Fuji Jukogyo Kabushiki Kaisha, Tokyo, Japan

[21] Appl. No.: 500,512

[22] Filed: Jun. 2, 1983

[30] Foreign Application Priority Data

Jun. 9, 1982 [JP] Japan ................... 57-98948

[51] Int. Cl.³ ............................ F02B 37/12
[52] U.S. Cl. .................................... 60/602
[58] Field of Search ................. 60/600, 601, 602, 603, 60/611; 123/564

[56] References Cited

U.S. PATENT DOCUMENTS 4,372,119 2/1983 Gillbrand ........................ 60/600

FOREIGN PATENT DOCUMENTS 2912929 10/1980 Fed. Rep. of Germany ........ 60/602
53-76213 7/1978 Japan .
129719 10/1981 Japan ..................... 60/602

Primary Examiner—Michael Koczo
Attorney, Agent, or Firm—Martin A. Farber

[57] ABSTRACT

A system for controlling the supercharging pressure of an engine with a turbocharger. A bypass is provided to bypass an exhaust-gas turbine of the turbocharger and a waste gate valve is provided in the bypass. An actuator is provided for operating the waste gate valve. A pressure sensor is provided for detecting the pressure in one of cylinders of the engine and for producing an electric output voltage dependent on the pressure, and a peak hold circuit is provided for holding a peak voltage of the output voltage of the pressure sensor in one cycle of the operation of the engine. The peak voltage is compared with a reference value by a comparator and a signal is produced by the comparator when the peak voltage exceeds the reference value. The system operates in response to the signal for operating the actuator, so that the waste gate is opened so as to control the supercharging pressure to a substantially constant value.

3 Claims, 2 Drawing Figures

SYSTEM FOR CONTROLLING THE SUPERCHARGING PRESSURE OF A TURBOCHARGED INTERNAL COMBUSTION ENGINE HAVING MEANS FOR SENSING CYLINDER PRESSURE

BACKGROUND OF THE INVENTION

The present invention relates to a system for controlling the supercharging pressure of an internal combustion engine with a turbocharger.

An internal combustion engine for an automobile is provided with a turbocharger driven by an exhaust gas turbine having a small capacity, so that the turbocharger may operate at a low engine speed. In such an engine, supercharging pressure excessively increases with increase of engine speed, which may cause breakdown of the engine at high engine speed. In order to avoid such a damage, for example, a system has been proposed by Japanese Patent Laid-Open Specification No. 53-76213. The system comprises a bypass provided in the exhaust-gas turbine, a waste gate valve in the bypass, and an actuator for operating the waste gate valve. The actuator comprises a diaphragm operatively connected to the waste gate valve, an atmosphere chamber and a supercharging pressure chamber partitioned by the diaphragm. The diaphragm is deflected by the difference between the atmospheric pressure and the supercharging pressure when the supercharging pressure increases. Thus, the actuator operates to open the waste gate valve to discharge the exhaust gases through the bypass when the engine speed is higher than a predetermined speed. Accordingly, the increase of supercharging pressure is prevented However, since the atmospheric pressure is low at high altitude, the actuator operates at a low supercharging pressure, so that the supercharging pressure is lower than at low altitude in spite of the same engine speed. Therefore, an increase of the engine output by the turbocharger cannot be obtained at high altitude.

SUMMARY OF THE INVENTION

An object of the present invention is to provide a system which controls the supercharging pressure to a proper value regardless of the atmospheric pressure, whereby the engine output is increased also at high altitude by supercharging.

According to the present invention, there is provided an improved system for controlling the supercharging pressure of an internal combustion engine having an intake manifold, an exhaust manifold, a turbocharger comprising an exhaust-gas turbine, a bypass for bypassing the exhaust-gas turbine, and a waste gate valve provided in the bypass, wherein the improvement comprising: actuating means for actuating the waste gate valve; a pressure sensor for detecting the pressure in one of cylinders of the engine and for producing an electric output voltage dependent on the pressure; a peak hold circuit for holding a peak voltage of the output voltage of the pressure sensor in one cycle of the operation of the engine; a comparator for comparing the peak voltage held by the peak hold circuit with a reference value and for procuding an output when the peak voltage exceeds the reference value; circuit means responsive to the output of the comparator for operating the actuating means, so that the waste gate is opened.

The present invention will be more apparent from the following description made with reference to the accompanying drawings.

DETAILED DESCRIPTION OF THE PEFERRED EMBODIMENT

Figure 1:
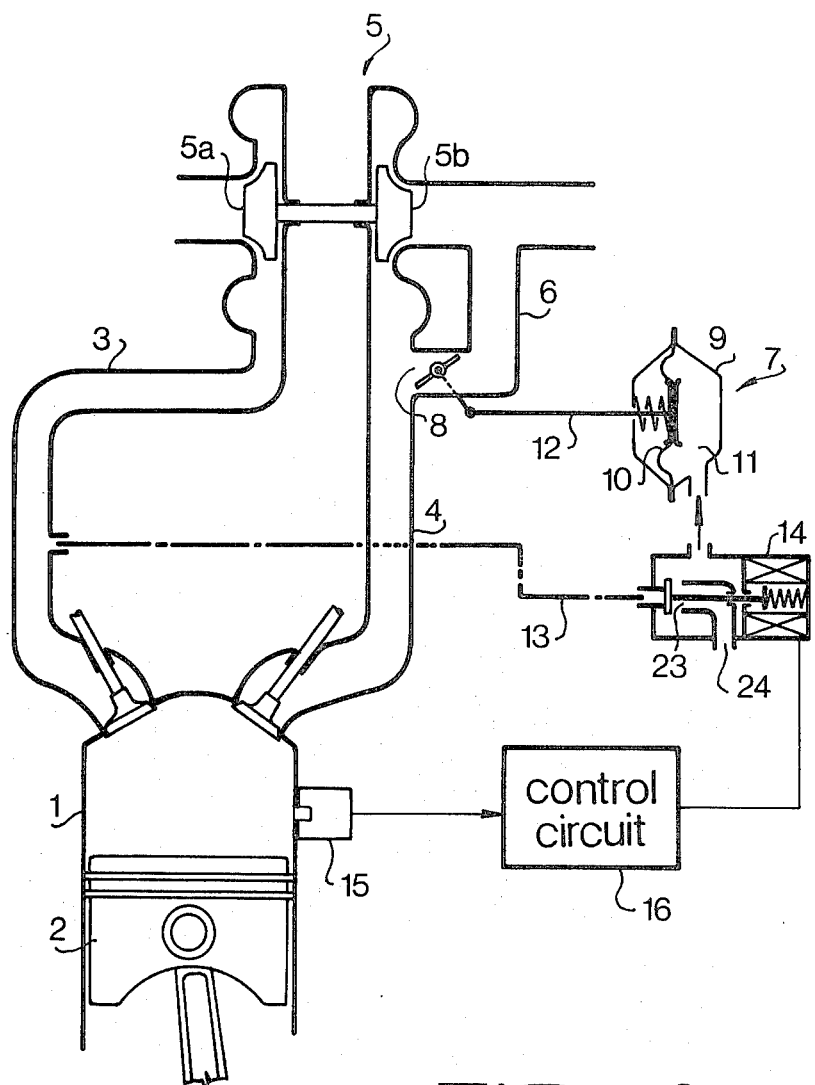
FIG. 1 is a schematic view of a system according to the present invention.

Referring to FIG. 1, a cylinder 1 of an engine is provided with a piston 2, an intake manifold 3 and an exhaust manifold 4. A turbocharger 5 is installed in the engine. The turbocharger 5 comprises a compressor 5a in the intake manifold 3 and an exhaust-gas turbine 5b provided in the exhaust manifold 4 so as to be driven by exhaust gases. The compressor 5a is operatively connected to the turbine 5b to supercharge. A bypass 6 is connected to the exhaust manifold 4 to bypass the turbine 5b. Provided in the bypass 6 is a waste gate valve 8 which is adapted to be operated by an actuator 7. The actuator 7 comprises a housing 9, and a diaphragm 10 defining an actuator chamber 11. The diaphragm 10 is operatively connected to the shaft of the valve 8 by a rod 12 to cause the rotation of the vane of the valve. The actuator chamber 11 is communicated with the intake manifold 3 by a conduit pipe 13 through a solenoid-operated control valve 14. The conduit pipe 13 is opened to the intake manifold at the downstream side of the compressor 5a so as to supply the supercharging air to the actuator chamber 11.

In the cylinder 1, a piezoelectric crystal pressure sensor 15 is provided to sense the pressure of gases in the cylinder. The output of the pressure sensor 15 is applied to a control circuit 16 which produces an output dependent on the pressure in the cylinder to control the control valve 14.

Figure 2:
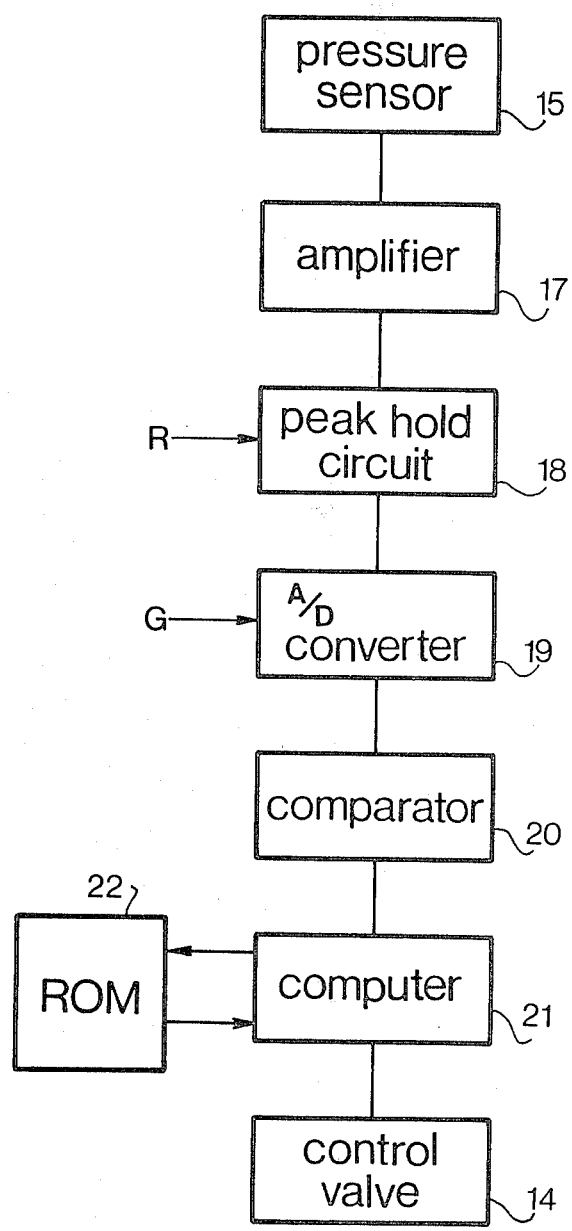
FIG. 2 is a block diagram showing a circuit in the system of the present invention.

Referring to FIG. 2, the control circuit 16 comprises an amplifier 17, peak hold circuit 18, A/D converter 19, comparator 20, computer 21 and ROM 22. The output of the pressure sensor 15 is amplified by the amplifier 17. The peak hold circuit 18 holds a peak voltage applied from the amplifier that is peak pressure in the cylinder 1. The peak hold circuit is reset by a reset signal R at every ignition timing. Accordingly, the peak hold circuit holds a peak voltage every cycle of the engine. The A/D converter 19 produces a digital output corresponding to the peak voltage in response to a gate signal G at a proper time which is after the peak explosion pressure in the cylinder every cycle. The peak voltage produced from the A/D converter 19 is applied to the comparator 20 to be compared with a reference voltage. The comparator produces an output dependent on the difference between the peak voltage and the reference value.

When the engine speed is low, and hence the pressure in the cylinder is low, the output of the A/D converter 19 is lower than the reference value in the comparator 20. Therefore, no output is produced from the comparator 20 and the computer 21 does not produce an output, so that the solenoid of the control valve 14 is not excited. Accordingly, the actuator chamber 11 communicates with the atmosphere through ports 23 and 24 of the control valve 14, so that the diaphragm 10 acts to close the waste gate valve 8. Thus, exhaust gases discharged from the engine are supplied in its entirety to the turbine 5b to drive it, thereby to drive the compressor 5a. Accordingly, a large amount of air is supplied to the engine at a high supercharging pressure. When the pressure in the cylinder 1 exceeds a predetermined value owing to the high supercharging pressure, the comparator 20 produces an output level of which is dependent on the difference between the output of the A/D converter and the reference value. The computer 21 operates in response to the input applied from the comparator and looks up a data map stored in the ROM 22 to get a data corresponding to the input. The data map in the ROM comprises a plurality of data for producing various pulse trains. In accordance with the data, the computer produces an output pulse train, the duty ratio of which is dependent on the data. The pulse train intermittently energizes the solenoid of the control valve 14 to intermittently open the valve to communicate the intake manifold 3 with the actuator chamber 11 through the conduit 13. Thus, the waste gate valve 8 is opened and closed by the actuator 7 at a duty ratio of the pulse train. The amount of exhaust gases passing through the bypass 6 increases with the increase of the pressure in the cylinder. Thus, the supercharging pressure is maintained to a substantially constant maximum value within an allowable range.

It will be understood that the waste gate valve 8 can be directly operated by an electrical control device which is operated by the control circuit 16.

In accordance with the system of the present invention, the supercharging pressure is controlled in dependency on peak pressure in the cylinder of the engine, which hardly changes with the change of altitude. Further the amount of exhaust gases passing the waste gate valve is controlled in dependency on the peak pressure. Therefore, the supercharging pressure is maintained to a substantially constant maximum value at high engine speed.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. An improved system for controlling the supercharging pressure of an internal combustion engine having an intake manifold, an exhaust manifold, a turbocharger comprising an exhaust-gas turbine, a bypass for bypassing said exhaust-gas turbine, and a waste gate valve provided in said bypass, wherein the improvement comprising:
   actuating means for actuating said waste gate valve;
   a pressure sensor for detecting the pressure in one of cylinders of said engine and for producing an electric output voltage dependent on the pressure;
   a peak hold circuit for holding a peak voltage of said output voltage of said pressure sensor in one cycle of the operation of said engine;
   a comparator for comparing said peak voltage held by said peak hold circuit with a reference value and for producing an output when the peak voltage exceeds the reference value;
   circuit means responsive to said output of said comparator for operating said actuating means, so that said waste gate valve is opened.

2. The system according to claim 1 wherein said actuating means comprises a fluid-operated actuator and a solenoid-operated control valve for controlling the fluid applied to said fluid-operated actuator.

3. The system according to claim 2 wherein said circuit means comprises a computer having a memory storing a plurality of data for producing various pulse trains which operate said solenoid-operated control valve.

* * * * *